US005854580A

United States Patent [19]

Konda et al.

[11] Patent Number: 5,854,580

[45] Date of Patent: Dec. 29, 1998

[54] BREAKER DEVICE

[75] Inventors: Kazumoto Konda; Kunihiko Watanabe, both of Yokkaichi; Toshiyuki Sekimori; Yasuyoshi Fukao, both of Toyota, all of Japan

[73] Assignee: Sumitomo Wiring Systems, Ltd., Japan

[21] Appl. No.: 856,018

[22] Filed: May 14, 1997

[30] Foreign Application Priority Data

May 17, 1996 [JP] Japan .................................... 8-123196

[51] Int. Cl.[6] .................................................... H01M 67/02

[52] U.S. Cl. ............................................ 335/132; 335/202

[58] Field of Search ..................................... 335/132, 202; 200/293–305; 337/186–191

[56] References Cited

U.S. PATENT DOCUMENTS 2,167,499 7/1939 Dickinson .
4,800,352 1/1989 Haury et al. ............................ 335/132
5,381,119 1/1995 Robbins et al. ......................... 335/132
5,476,392 12/1995 Inaba et al. .

FOREIGN PATENT DOCUMENTS 1 444 198 A 9/1966 France .
11 49 767 B 6/1963 Germany .

*Primary Examiner*—Lincoln Donovan
*Attorney, Agent, or Firm*—Anthony J. Casella; Gerald E. Hespos; Ludomir A. Budzyn

[57] ABSTRACT

A breaker device excellent in safety and contained in a compact casing. In a casing 1, a pair of fixed electrodes 11*a*, 11*b* is projected, and a movable electrode 31, which is fitted with and detached from the fixed electrodes, is arranged. A handle 40 is inclinably supported by a supporting shaft 45. On the top surface of an upper casing 3, a pair of poles 70 is erected, and rectangular solid sliding projections 71 are projected, while guiding grooves 73 are formed in side faces of the handle 40. In each of the guiding grooves 73, an arc-shaped portion allowing the sliding projection 71 to rotate about the supporting shaft 45 is provided at an upper end of a linear portion which allows the sliding projection 71 only to slide therealong. When the movable electrode 31 is inserted with the handle being erected, the sliding projections are guided by the linear portions, while the handle 40, maintained in an erected state, is inserted. When both the electrodes are normally fitted, the sliding projections 71 reach the arc-shaped portions and relatively introduce thereinto, whereby the handle 40 can be inclined.

9 Claims, 7 Drawing Sheets

BREAKER DEVICE

BACKGROUND OF THE INVENTION

The present invention relates to a breaker device for use in, for example, an electric car in which the breaker device is interposed in the a power line or the like.

Conventionally, this type of breaker device is a so-called knife switch type one which has a pair of fixed electrodes arranged on a substrate, spaced apart from each other, and a lever shaped movable electrode rotatably supported on one of the fixed electrodes, such that the movable electrode is inclined from its erected state to be inserted into an elastic clipping piece formed on the other fixed electrode, thus allowing the electric conduction between the two fixed electrodes.

However, the knife edge type breaker device cannot be regarded as preferable for all applications in consideration of safety because its conductive paths are exposed and because a large current flows particularly on a power line of an electric car.

SUMMARY OF THE INVENTION

The present invention has been completed on the basis of the situation mentioned above, and is intended to provide a breaker device which is excellent in safety and can be contained in a compact casing.

To achieve the above object, according to the present invention, a breaker device comprises a pair of fixed electrodes, a movable electrode fitted with and detached from both the fixed electrodes for disconnecting and connecting between both the fixed electrodes, and a handle inclinably arranged on the movable electrode for inserting and detaching operations, the movable and fixed electrodes accommodated in a casing. In the breaker device, the handle is provided with guiding grooves for guiding only relative sliding of sliders arranged on the casing side in association with an inserting operation thereof, and each of the guiding grooves is provided with an inclination allowing portion for allowing a relative displacement of the slider to allow the handle to incline at the time the insertion is completed, at which both the electrodes are normally fitted.

When the movable electrode is inserted with the handle being erected, sliders arranged in the casing are guided by the guiding grooves of the handle, and the movable electrode is inserted with the handle held in an erected state. Since the sliders reach the inclination allowing portions at the time the insertion is completed, at which both the electrodes are normally fitted, the handle can be inclined as the sliders are relatively displaced.

Further, according to the present invention, each of the guiding groove is linearly formed along a direction in which the handle is inserted for guiding only relative sliding of the slider, and an arc-shaped portion centered on an inclining shaft of the handle is formed continuously to one end of the linear portion to form the inclination allowing portion.

When the movable electrode is inserted with the handle being erected, the sliders are guided by the linear portions of the guiding grooves, and the movable electrode is inserted with the handle held in an erected state. Since the sliders reach entrances of the arc-shaped portions at the time the insertion is completed, at which both the electrodes are normally fitted, the handle can be inclined about the inclining shaft while the sliders are relatively introduced into the arc-shaped portions As mentioned above, according to the present invention, since the breaker device is constructed such that conductive paths are enclosed in the casing, the breaker device is excellent in safety, and can be arranged in a compact form since the handle can be inclined. In addition, since the handle is held in an erected state during an inserting operation, i.e., since the handle does not shake, the inserting operation can be smoothly performed. Furthermore, since the handle cannot be inclined until both the electrodes are normally fitted, both the electrodes can be prevented from being left in a slightly fitted state.

DETAILED DESCRIPTION OF PREFERRED EMBODIMENT

One embodiment of the present invention will hereinafter be described with reference to FIGS. 1–9.

Figure 1:
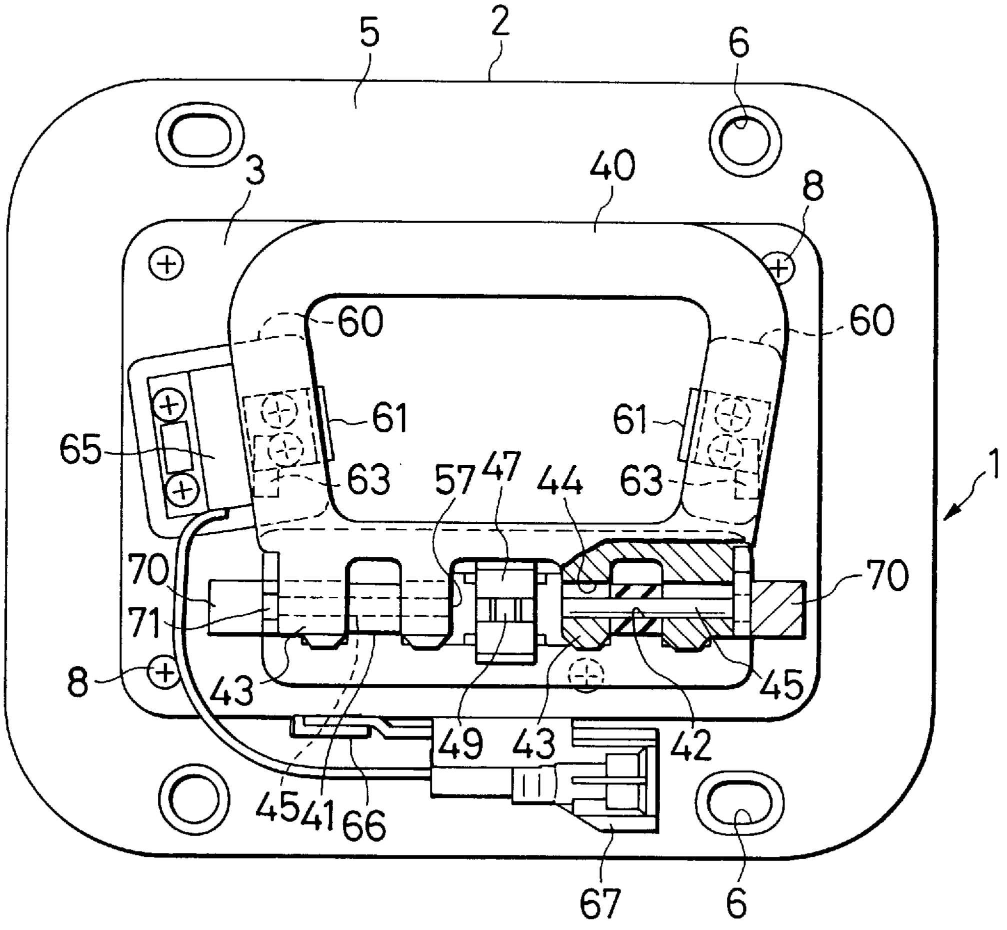
FIG. 1 is a top plan view of an embodiment of the present invention with a handle being inclined.
Figure 2:
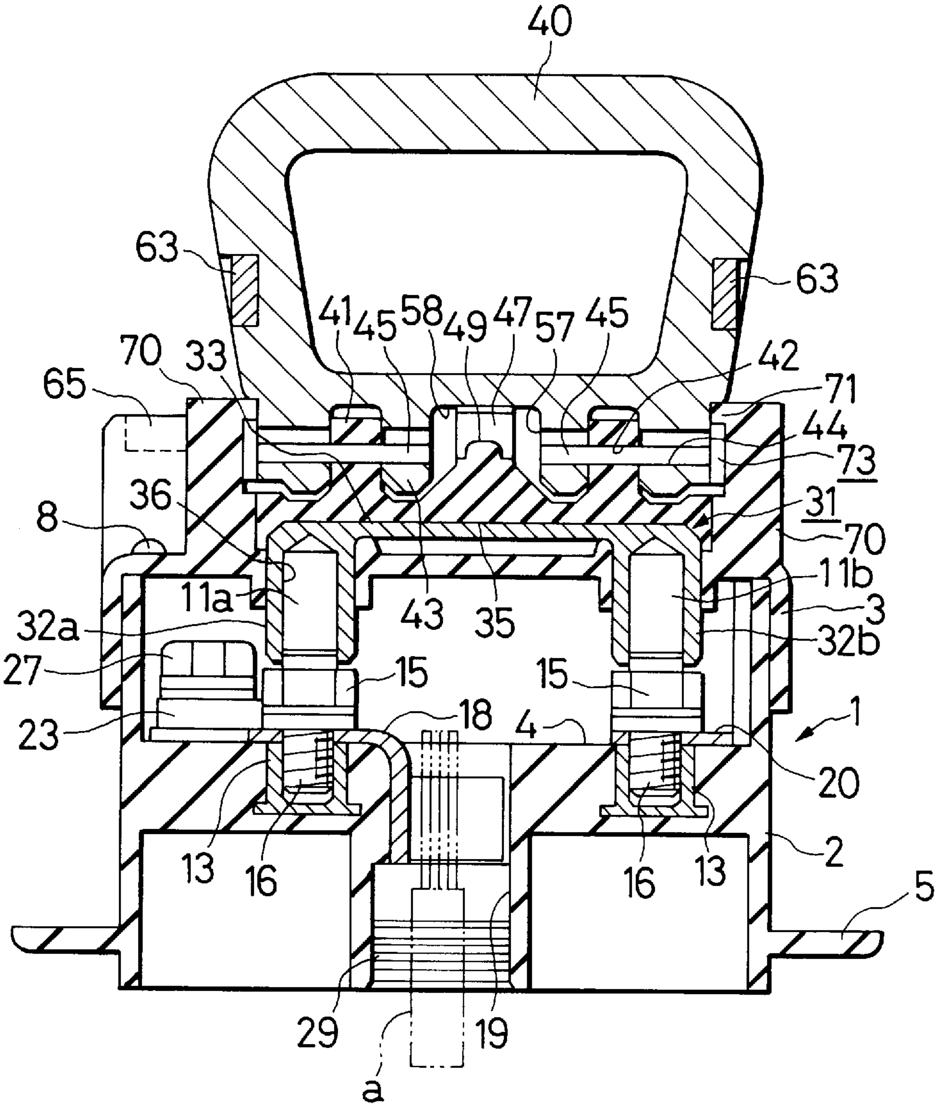
FIG. 2 is a cross-sectional view of the embodiment in a state with the handle being erected.
Figure 3:
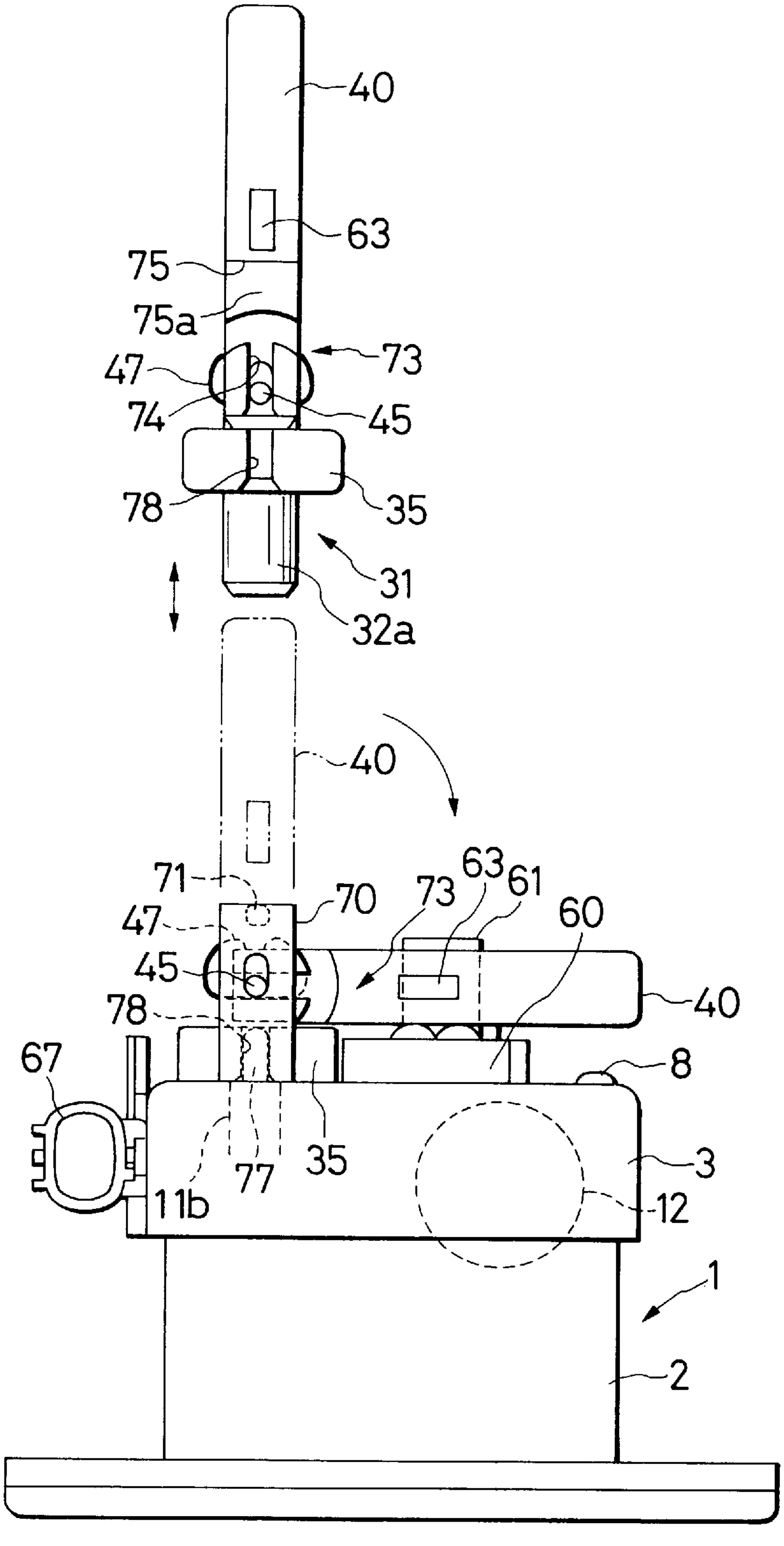
FIG. 3 is a side view for explaining handle inserting and detaching operations.

Referring first to FIGS. 1–3, a casing made of synthetic resin, designated by reference numeral 1, is composed of a lower casing 2 and an upper casing 3. The lower casing 2 is formed in a shape of a closed prism substantially rectangular in plane, with a bottom surface gradually rising toward a deep portion substantially at the center thereof. The lower casing 2 is formed with a mounting flange 5 on the outer periphery of a lower end such that the lower casing 2 is mounted on a car body, not shown, with bolts screwed into mounting holes 6 formed therethrough at four corner portions.

The upper casing 3, on the other hand, is formed in a lid-shape attached to an upper end of the lower casing 2, and is detachably mounted on the lower casing 2 by tightly screwing bolts 8, extending through inserting holes formed in the upper face of the upper casing 3, into threaded holes formed in the upper end face of the lower casing.

A pair of fixed electrodes 11*a*, 11*b* is projected from one side of the above-mentioned lower casing 2 (on the front side of FIG. 4), while a fuse 12 is housed on the other side of the same. For erecting the fixed electrodes 11*a*, 11*b*, a pair of internal threads 13 is buried with a predetermined spacing therebetween by an insertion process. Each of the fixed electrodes 11*a*, 11*b*, having a pin-like shape, is formed with a hexagonal portion 15 at the center in the longitudinal direction and with an external thread 16 on a lower end portion. Thus, the fixed electrodes 11*a*, 11*b* are projected from the lower casing 2 by screwing the respective external threads 16 into the associated internal threads 13.

Figure 4:
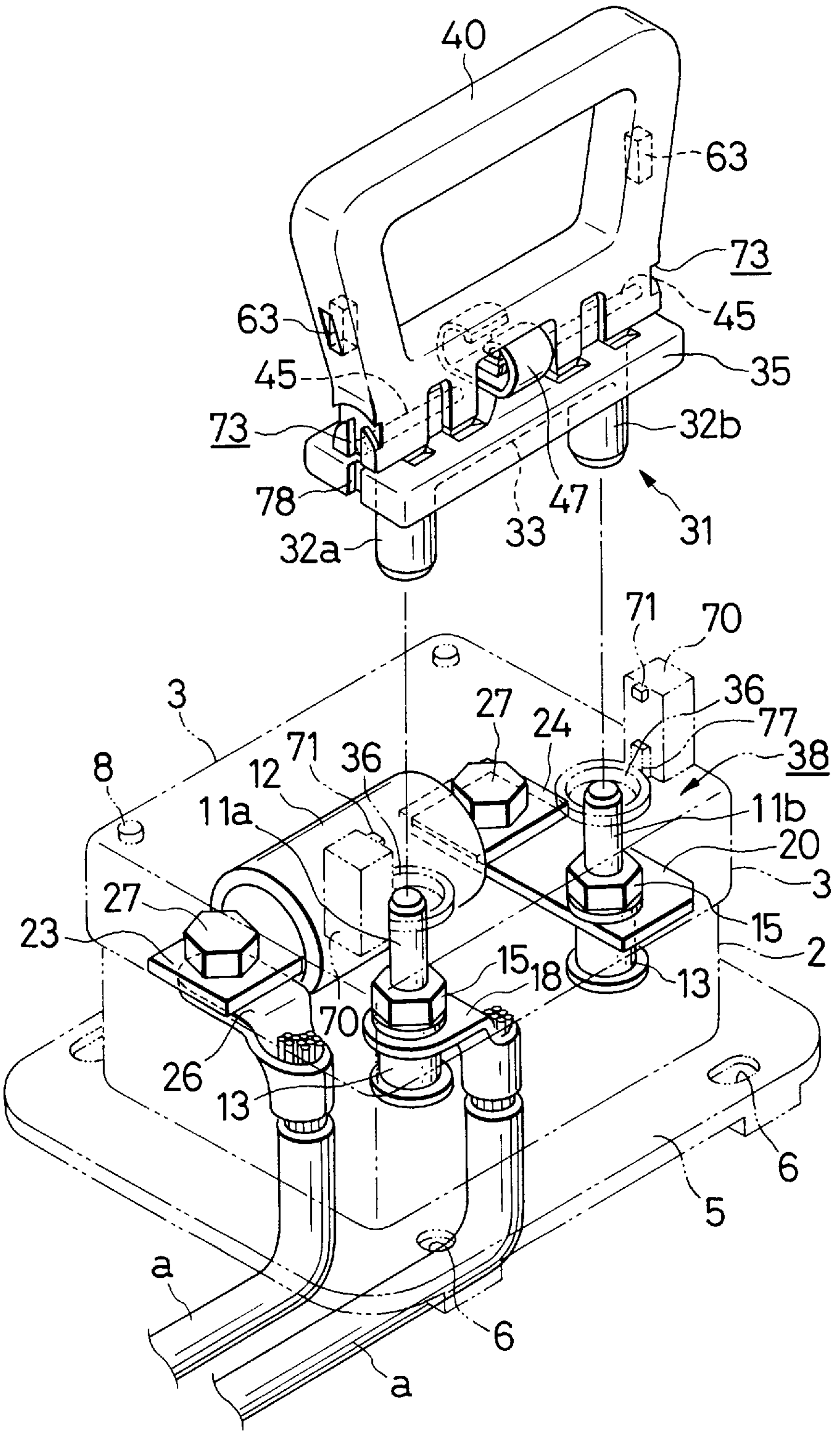
FIG. 4 is a perspective view illustrating the construction of the internal construction of a casing and the construction of a mounting body.

A terminal plate 18, connected to one of segmented portions of a wire a, is clamped together with one of the fixed electrodes 11*a* (the left one in FIG. 2), as illustrated in FIG. 4. The wire a is drawn to the outside through a through-hole 19 which is open to the outside on the bottom surface 4 of the lower casing 2. Also, a bus bar 20, connected to one end of the fuse 12, as later described, is securely clamped together with the other fixed electrode 11*b* in a similar manner.

As mentioned above, the fuse 12 is housed on the other side of the bottom surface 4 of the lower casing 2. Connecting strips 23, 24 are projected from both ends of the fuse 12, and a terminal plate 26 connected to the other segmented portion of the wire a is securely clamped to the connecting strip 23 with a bolt 27. The wire a is drawn to the outside through a through-hole (not shown) similar to the above-mentioned one opened on the bottom surface 4. A waterproof rubber plug 29 surrounding the outer periphery of the wire a is fitted in each of the through-holes 19 for sealing. The bus bar 20 has one end securely clamped to the other connecting strip 24 of the fuse 12 in an erected state with a bolt 27 and the other end clamped together to the fixed electrode 11*b*, as previously described.

Figure 5:
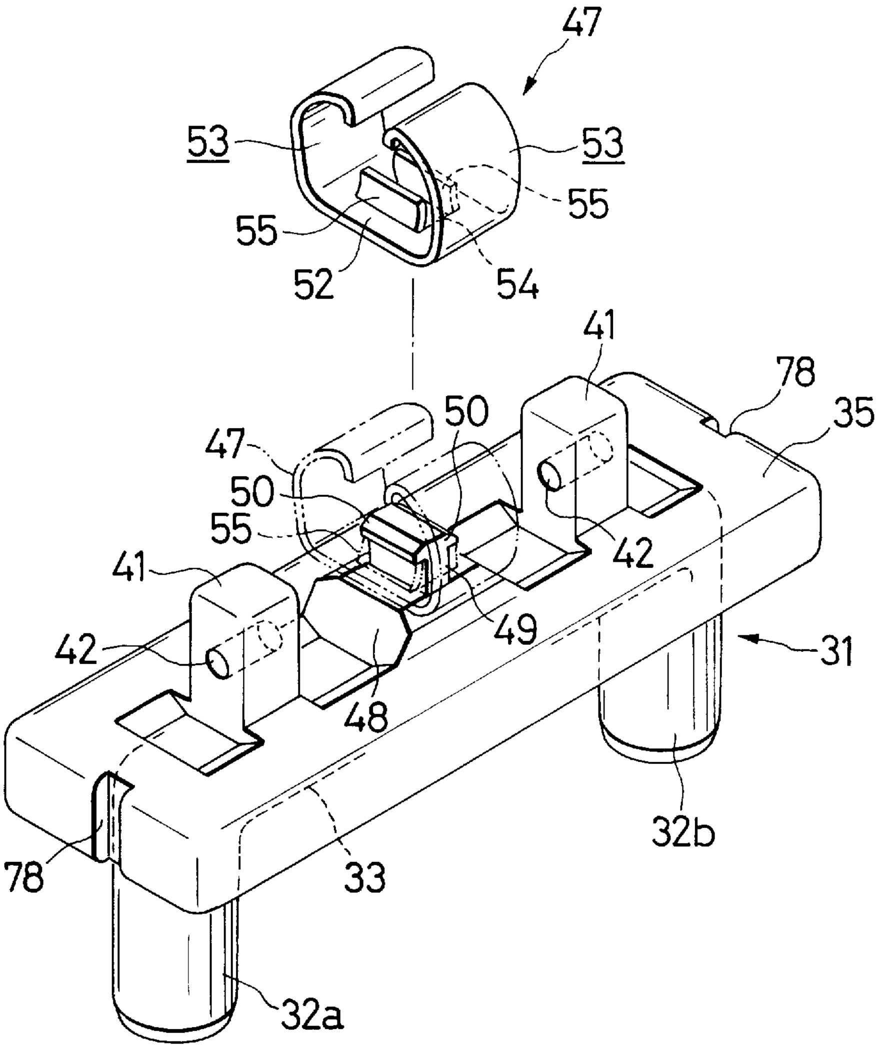
FIG. 5 is a perspective view illustrating the construction of a portion which a spring member is mounted.

The above-mentioned pair of fixed electrodes 11*a*, 11*b* is configured such that a movable electrode 31 is detachably fitted therewith. The movable electrode 31, as illustrated in FIG. 2, has a pair of louver terminals 32*a*, 32*b*, into which the top ends of the fixed electrodes 11*a*,11*b* can be inserted, and a bridge portion 33 extending between the louver terminals 32*a*, 32*b*. Then, the movable electrode 31 has such a construction that the respective louver terminals 32*a*, 32*b* are formed by an insertion process to downwardly project from the lower face of an elongated mounting body 35, made of synthetic resin, as illustrated in FIG. 5.

A pair of insertion holes 36 is open in the top surface of the upper casing 3 above the respective fixed electrodes 11*a*, 11*b* for insertion of the louver terminals 32*a*, 32*b* of the movable electrode 31 thereinto. Specifically, the respective louver terminals 32*a*, 32*b* of the movable terminal 31 are fitted with and pulled out from the pair of fixed electrodes 11*a*, 11*b* through the insertion holes 36, thereby constructing a breaker switch 38 for providing connection and disconnection between the fixed electrodes 11*a*, 11*b*. The fuse 12 is consequently connected in series to the breaker switch 38 in the middle of the wire a.

A handle 40 is provided on the upper side of the mounting body 35 of the movable electrode 31 for insertion and pull-out manipulations. The handle 40 is formed in a frame shape having a inverted trapezoidal shape in its outer shape. At both ends in the longitudinal direction of the top surface of the mounting body 35, bearing members 41 each formed with a bearing hole 42 therethrough are projected from the top surface. A pair of bearing members 43 is projected from edges of the side on which the handle 40 is mounted. Each of the bearing members 43 has a bearing hole 44 formed therethrough and forks into two so as to sandwich the bearing member 41 therebetween.

Then, between the fork-like bearing members 43 of the handle 40, corresponding bearing members 41 of the mounting body 35 are inserted, and a supporting shaft 45 is inserted through the bearing holes 42, 44 of the bearing members 41, 42, whereby the handle 40 is supported so as to be swingable around the supporting shaft 45 on the top surface of the mounting body 35.

The handle 40 is designed to be held by means of a toggle action applied thereto, at an erected state (represented by chain lines in FIG. 3) at which the handle 40 erects opposite to the projecting direction of the louver terminals 32*a*, 32*b* and at an inclined state (represented by solid lines in FIG. 3) at which the handle 40 lies orthogonal to the projecting direction of the louver terminals 32*a*, 32*b*. For this construction, a spring member 47, as illustrated in FIG. 5, is provided between the mounting body 35 and the handle 40.

A projected portion 48 is formed on the top surface of the mounting body 45 at the center in the longitudinal direction. On the top surface of the projected portion 48, a mounting projection 49 is projected in the shape of a prism rectangular in plane elongated in a direction perpendicular to the longitudinal direction of the mounting body 35. A flag 50 is also projected on an upper end of a plane proximal to a long side of the mounting projection 49. The spring member 47 is fabricated by press-molding a spring steel plate, and comprises a strip-like base 52 and folded portions 53 symmetrically formed on both ends of the base 52 which are folded inwardly in a predetermined shape. At the center of the base 52, a square fitting hole 54 is opened for fitting the mounting projection 49 thereinto. A pair of engaging pieces 55 is formed by raising portions of the base 52, cut for forming the fitting hole 54, from both edge sides proximal to the longer sides. In a state in which the base 52 is arranged orthogonal to the mounting body 35, the spring member 47 has its fitting hole 54 mated with the mounting projection 49, and the base 52 is pressed against the projected portion 48, as indicated by chain lines in FIG. 5, with the tips of both engaging pieces 55 being engaged to the flag 50 of the mounting projection 49, whereby the spring member 47 is mounted in a dislocation preventing state as well as in a whirl stop state.

A housing recess 57 is formed at the center of an outer face of an edge proximal to the mounting side of the handle 40 for housing the spring member 47 mounted to the mounting body 35, the distal face of which is an abut face 58 to which the folded portions 53 of the spring member 47 abut.

Specifically, the handle 40 is swung about the supporting shaft 45 with its abut face 58 abutting to the folded portions 53 of the spring member 47 to elastically contract the spring member 47. In this event, the handle 40 receives a kind of toggle action, such that the handle 40 can be stably held in an erected state in which the handle 40 is erected in a direction opposite to the projecting direction of the louver terminals 32*a*, 32*b* with the abut face 58 abutting to both the folded portions 53 up to the tips thereof, and in an inclined state in which the handle 40 lies orthogonal to the projecting direction of the louvers 32*a*, 32*b* with the abut face 58 fully abutting to a side face of one of the folded portions 53.

A portion in which the fuse 12 is housed on the ceiling face of the upper casing 3 and a portion corresponding thereto are provided with receiving portions 60, as illustrated in FIGS. 1, 3, and an L-shaped receiving member is mounted on the respective receiving portions 60, such that when the movable electrode 31 is normally fitted with the fixed electrodes 11*a*, 11*b* with the handle 40 placed to the above-mentioned inclined state, the receiving members 61 receive both side edges of the handle 40 with substantially central portions of the side edges being fitted thereinto.

Also, magnets 63 are inserted at symmetric positions of the outer sides of the both the side edges of the handle 40. A lead switch 65 is mounted on the ceiling face of the upper casing 3, wherein the lead switch 65 is positioned so as to face one of the magnets 63 when the movable electrode 31 is normally fitted with the fixed electrodes 11*a*, 11*b* and the handle 40 is placed in the inclined state. The lead switch 65 can send a detecting signal when the magnet 63 is positioned immediately in front thereof. The lead switch 65 is connected to a control computer, not shown, through a connector 67 mounted on a side face of the upper casing 3 through a bracket 66.

This embodiment provides means for preventing the handle 40 from shaking when the handle 40, i.e., the movable electrode 31 is inserted as well as for preventing the movable electrode 31 and the fixed electrodes 11*a*, 11*b* from being left in an incompletely fitted state. In the following, this means will be described.

A pair of poles 70 protrudes on the top surface of the upper casing 3 on the left and right to the positions at which the handle 40 is inserted, as indicated by chain lines in FIG. 4. On upper ends of mutually opposing faces of the respective poles 70, sliding projections 71, each having a rectangular shape in front elevation, are formed projecting a predetermined dimension therefrom.

Figure 6:
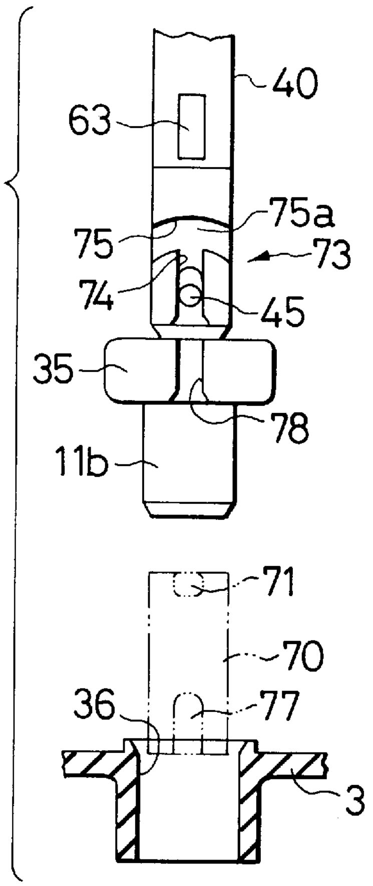
FIG. 6 is a partial side view of the handle before it is inserted.

On the other hand, guiding grooves 73 into which the sliding projections 71 are guided and inserted in association with an inserting operation of the handle 40 are formed in both outer faces of an inserted portion of the supporting shaft 45 in the handle 40. Each of the guiding grooves 73, as illustrated in FIG. 6, comprise a linear portion, the lower end of which is opened so that the sliding projection 71 is freely fitted thereinto without allowing the same to rotate. The upper end of the linear portion 74 is formed with an arc-shaped portion 75 having an arc shape about the supporting shaft 45, which is symmetric in a lengthwise direction and is in communication with the linear portion 74. The sliding projection 71 can be introduced into the arc-shaped portion 75. Ends of the arc-shaped portion 75 are open to the front and rear faces of the handle 40.

As the handle 40 is inserted to cause the movable electrode 31 to be gradually fitted with the fixed electrodes 11*a*, 11*b*, the sliding projections 71 begin entering into the linear portions 74 of the guiding grooves 73, and the movable electrode 31 is normally fitted with the fixed electrodes 11*a*, 11*b*. When the insertion of the handle 40 is completed, the sliding projections 71 reach the upper ends of the linear portions 74, i.e., entrances 75*a* of the arc-shaped portions 75.

Guiding projections 77 arranged in the vertical direction, are formed at positions below the sliding projections 71 of the poles 70, as illustrated in FIG. 4, while vertical grooves 78 are formed in left and right end faces of the mounting body 35, such that the mounting body 35 is guided thereby when the handle 40 is inserted.

This embodiment has the construction as described above. Next, its operation will be explained. In the casing 1, the pair of fixed electrodes 11*a*, 11*b* projects, and the fuse 12 is housed and connected in the manner previously described in conjunction with the segmented portions of the wire a. For making the wire a conductive, the handle 40 is raised to the erected position outside the casing 1. The toggle action, previously described, forces the handle 40 to remain in the erected position.

Subsequently, the louver terminals 32*a*, 32*b* of the movable electrode 31 projecting from the mounting body 35 are inserted into the insertion holes 36 of the upper casing 3 with the handle 40. In this event, since the handle 40 is held by the mounting body 35, the mounting body 35, i.e., the movable electrode 31 does not shake, so that the operation for inserting both the louver terminals 32*a*, 32*b* into the insertion holes 36 can be smoothly carried out.

As the insertion is advanced to cause the louver terminals 32*a*, 32*b* to begin fitting with the corresponding fixed electrodes 11*a*, 11*b*, the louver terminals 32*a*, 32*b* receive insertion resistance, so that the handle 40 is more likely to shake because of an insufficient holding force provided by the spring member 47. However, at a stage where the louver terminals 32*a*, 32*b* begin entering, the sliding projection 71 formed projecting from the pole 70 of the upper casing 3 enters into the linear portion 74 of the guiding groove 73. In this state, when the handle 40 is to be inclined, the sliding projection 71, if its position deviates from the axial line of the supporting shaft 45, abuts to the side edge of the linear portion 74 to prevent the handle 40 from inclining. Also, when the sliding projection 71 is positioned coaxial with the supporting shaft 45, the sliding projection 71, formed in a rectangular shape, is prevented from rotating, so that the handle 40 cannot incline as long as the sliding projection 71 lies in the linear portion 74. Therefore, the handle 40 is straightly inserted without shaking, so that the louver terminals 32*a*, 32*b* are smoothly fitted on the fixed electrodes 11*a*, 11*b*. This causes the breaker switch 38 to turn on, with the result that the wire a is conducted through the fuse 12 to be in a usable state.

Figure 8:
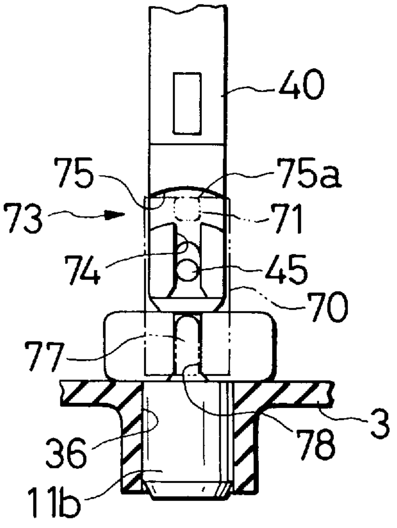
FIG. 8 is a partial side view of the handle when it is completely inserted.
Figure 9:
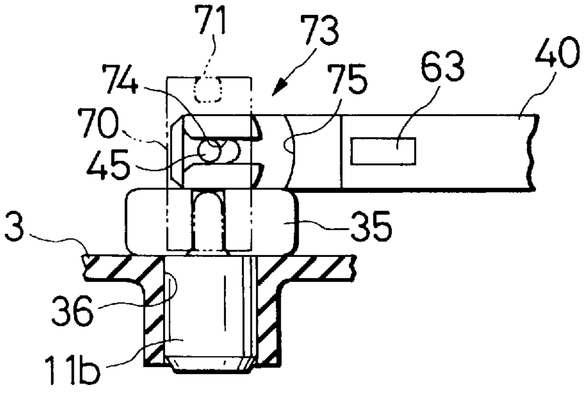
FIG. 9 is a partial side view of the handle when it is inclined.

In this event, if both the louvers 32*a*, 32*b* of the movable electrode 31 are normally fitted with the corresponding fixed electrodes 11*a*, 11*b*, the sliding projections 71 reach the upper ends of the linear portions 74 of the guiding grooves 73, i.e., the entrances 75*a* of the arc-shaped portions 75, as illustrated in FIG. 8. Thus, subsequently, the sliding projections 71 are introduced into the arc-shaped portions 75, and drawn out from the arc-shaped portions 75 in the middle, while the handle 40 is swung about the supporting shaft 45, whereby the handle 40 can be inclined as illustrated in FIG. 9. Even in this inclined state, the handle 40 is held by the toggle action of the spring member 47, so that the handle 40 will not shake even if vibrations or the like are transmitted thereto during the running of a car, thereby making it possible to prevent strange sound or the like.

Figure 7:
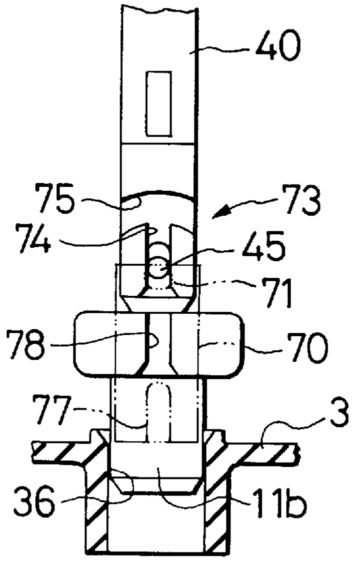
FIG. 7 is a partial side view of the handle which is being inserted.

On the other hand, in an incompletely fitted state in which the louver terminals 32*a*, 32*b* of the movable electrode 31 are not normally fitted with the corresponding fixed electrodes 11*a*, 11*b*, the sliding projections 71 still remain in the linear portions 74 as illustrated in FIG. 7, so that the handle 40 cannot be inclined, even if so intended, as described above. In this way, the incompletely fitted state can be detected, in which case the handle 40 may be again inserted up to a normal position.

It should be noted that since a pair each of sliding projections 71 and guiding grooves 73 is provided on both left and right sides, similar effects can be expected even if the handle 40 is inserted in a laterally inverted state.

In addition, when the handle 40 is inclined to the inclined state after the movable electrode 31 has been normally fitted with the fixed electrodes 11*a*, 11*b*, one of the magnets 63 arranged in the handle 40 responds when the lead switch 65 is found immediately in front of the magnet, and the lead switch 65 sends a detecting signal to electrically detect that the breaker switch 38 has normally turned on.

When the breaker switch 38 is turned off for maintenance or the like, the handle 40 is raised from the inclined state indicated by solid lines in FIG. 3 to the erected state and pulled up as it is, the movable electrode 31 is drawn out from the fixed electrodes 11*a*, 11*b*, causing the breaker switch 38 to turn off, thereby rendering the wire a inconductive.

Also, if the fuse 12 is burnt out, the movable electrode 31 is drawn out in a manner similar to the above to turn off the breaker switch 38. Subsequently, the screws 8 are unfastened to remove the upper casing 3. Then, the fuse 12 is exposed, so that the fuse 12 is replaced with a new one while the bolt 27 is unfastened. In this event, since the breaker switch 38 has already been turned off, the replacement can be safely gone through.

As described above, the breaker device of this embodiment is excellent in safety because of its construction having the conductive paths enclosed in the casing 1, and can be realized in a compact construction, particularly with a small height, since the handle 40 can be inclined when it is in use.

Also, in the middle of an operation for inserting the movable electrode 31, the handle 40 is maintained in an erected sate in spite of insertion resistance applied thereto, i.e., the handle 40 does not shake, so that the insertion operation can be smoothly performed. Furthermore, since the handle 40 cannot be inclined unless the movable electrode 31 is normally fitted with the fixed electrodes 11*a*, 11*b*, the movable electrode 31 and the fixed electrodes 11*a*, 11*b* are prevented from being left in an incompletely fitted state.

The present invention is not limited to the embodiments described above with reference to the accompanying drawings. For example, the following embodiment is also intended to be included in the technical scope of the present invention. That is, the present invention is not limited to a breaker device having an additional fuse but may be similarly applied to a breaker device simply comprising a breaker switch. Furthermore, a variety of modifications can be made without departing from the gist of the present invention.

What is claimed is:

1. A breaker device comprising:

a casing;

a pair of fixed electrodes extending substantially parallel to one another in the casing;

a movable electrode selectively insertable into the casing, said movable electrode being fittable with and detachable from both of said fixed electrodes for selectively disconnecting and connecting said fixed electrodes;

a handle inclinably arranged on said movable electrode said handle being disposed to enable selective movement of said movable electrode toward and away from said casing for selectively disconnecting and connecting said movable electrode with said fixed electrode;

projections disposed on said casing in proximity to said fixed electrodes; and said handle including guiding grooves engageable with said projections for guiding said handle and said movable electrode relative to said fixed electrodes and said casing, each of said guiding grooves includes an inclination preventing portion configured for preventing inclination of said handle relative to said movable electrode prior to complete fitting of said movable electrode with said fixed electrodes and an inclination allowing portion configured for allowing a relative displacement between said projections and said grooves to allow said handle to incline when fitting of the movable electrode with the fixed electrodes is completed.

2. A breaker device according to claim 1, further comprising an inclining shaft extending between and connecting said handle and said movable electrode for permitting inclining movement therebetween, and wherein the inclination preventing portion of each of said guiding grooves is linearly formed along a direction in which said handle is moved for connecting said movable electrode with said fixed electrodes, and wherein the inclination allowing portion of each said guiding groove is an arc-shaped portion centered on the inclining shaft of said handle at one end of said linear portion.

3. A breaker device according to claim 2, wherein said casing includes a pair of posts extending substantially parallel to said fixed electrodes, said projections being formed on said posts and being aligned substantially orthogonal to said fixed electrodes.

4. A breaker device according to claim 3, wherein the fixed electrodes are disposed between the posts of said casing.

5. A breaker device according to claim 4, wherein the projections extend toward one another from the respective posts.

6. A breaker device according to claim 5, wherein the projections are substantially colinearly aligned with one another.

7. A breaker device according to claim 6, wherein the movable electrode includes a pair of louver terminals extending substantially parallel to one another, said louver terminals being dimensioned and spaced from one another for selectively connecting and disconnecting said fixed electrodes, the linear portion of said guiding groove being aligned substantially parallel to said louver terminals.

8. A breaker device according to claim 7, further comprising a magnet disposed on said handle and a lead switch disposed on the casing at a location to be engaged by said magnet when said handle is inclined.

9. A breaker device according to claim 1, further comprising a magnet disposed on said handle and a lead switch disposed on the casing at a location to be engaged by said magnet when said handle is inclined.

* * * * *